(12) United States Patent
Vasudevan et al.

(10) Patent No.: US 10,013,491 B2
(45) Date of Patent: Jul. 3, 2018

(54) METHODS AND SYSTEMS OF WORKLOAD MOBILITY ACROSS DIVERGENT PLATFORMS

(71) Applicants: Aditya Vasudevan, Mountain View, CA (US); Venkatraman Lakshminarayanan, Chennai (IN); Sajith Kumar, Chennai (IN)

(72) Inventors: Aditya Vasudevan, Mountain View, CA (US); Venkatraman Lakshminarayanan, Chennai (IN); Sajith Kumar, Chennai (IN)

( * ) Notice: Subject to any disclaimer, the term of this patent is extended or adjusted under 35 U.S.C. 154(b) by 173 days.

(21) Appl. No.: 14/839,979

(22) Filed: Aug. 29, 2015

(65) Prior Publication Data
US 2016/0191623 A1 Jun. 30, 2016

Related U.S. Application Data

(60) Provisional application No. 62/043,961, filed on Aug. 29, 2014.

(51) Int. Cl.
*G06F 15/16* (2006.01)
*G06F 17/30* (2006.01)
*H04L 29/06* (2006.01)
*H04L 29/08* (2006.01)

(52) U.S. Cl.
CPC ........ *G06F 17/30864* (2013.01); *H04L 29/06* (2013.01); *H04L 67/1008* (2013.01); *H04L 67/1095* (2013.01)

(58) Field of Classification Search
CPC .................. H04L 29/06; H04L 29/08072
USPC ......................... 709/203, 220, 224, 228, 232
See application file for complete search history.

(56) References Cited

U.S. PATENT DOCUMENTS

| | | | |
|---|---|---|---|
| 8,448,170 B2 * | 5/2013 | Wipfel | H04L 9/3213 718/1 |
| 9,356,940 B2 * | 5/2016 | Hanna, Jr. | H04L 63/08 |
| 9,389,892 B2 * | 7/2016 | Ben Or | G06F 9/45533 |
| 9,451,043 B2 * | 9/2016 | Zhao | H04L 67/08 |
| 9,547,453 B2 * | 1/2017 | Glazemakers | G06F 3/0641 |
| 2011/0126207 A1 * | 5/2011 | Wipfel | H04L 9/3213 718/104 |
| 2012/0281708 A1 * | 11/2012 | Chauhan | H04L 63/0272 370/401 |
| 2013/0254768 A1 * | 9/2013 | Wipfel | H04L 9/3213 718/1 |
| 2014/0244488 A1 * | 8/2014 | Kim | G06Q 20/123 705/39 |
| 2014/0366155 A1 * | 12/2014 | Chang | G06F 21/10 726/27 |

* cited by examiner

*Primary Examiner* — Khanh Dinh

(57) ABSTRACT

In one aspect, a computerized method of workload mobility across divergent cloud-computing platforms includes the step of with an agentless process, utilizing at least one computer process to discover an entity. The method discovers a configuration of the entity. The method persistently stores the configuration of the entity in a configuration management database (CMDB). The method migrates, with at least one replication processes, the entity from a user-side platform to a cloud-computing platform. The method transforms a workload data of the entity to a container workload data to enable implementation of the workload data in the cloud-computing platform.

2 Claims, 2 Drawing Sheets

METHODS AND SYSTEMS OF WORKLOAD MOBILITY ACROSS DIVERGENT PLATFORMS

CROSS-REFERENCE TO RELATED APPLICATIONS

This application is a claims priority from U.S. Provisional Application No. 62/043,961 titled, METHODS AND SYSTEMS OF WORKLOAD MOBILITY ACROSS DIVERGENT PLATFORMS, and filed on 29 Aug. 2014. This application is hereby incorporated by reference in its entirety.

FIELD OF THE INVENTION

The invention is in the field of cloud computing and more specifically to a method, system and apparatus of methods and systems of workload mobility across divergent platforms.

DESCRIPTION OF THE RELATED ART

Traditionally applications once deployed on any infra/cloud architecture may then be locked into said architecture it without an option to move to another platform or system. Application mobility can also be helpful implementing copies for uses cases such as testing the app or having backup or disaster recovery options.

BRIEF SUMMARY OF THE INVENTION

In one aspect, a computerized method of workload mobility across divergent cloud-computing platforms includes the step of with an agentless process, utilizing at least one computer process to discover an entity. The method discovers a configuration of the entity. The method persistently stores the configuration of the entity in a configuration management database (CMDB). The method migrates, with at least one replication processes, the entity from a user-side platform to a cloud-computing platform. The method transforms a workload data of the entity to a container workload data to enable implementation of the workload data in the cloud-computing platform.

Figure 1:
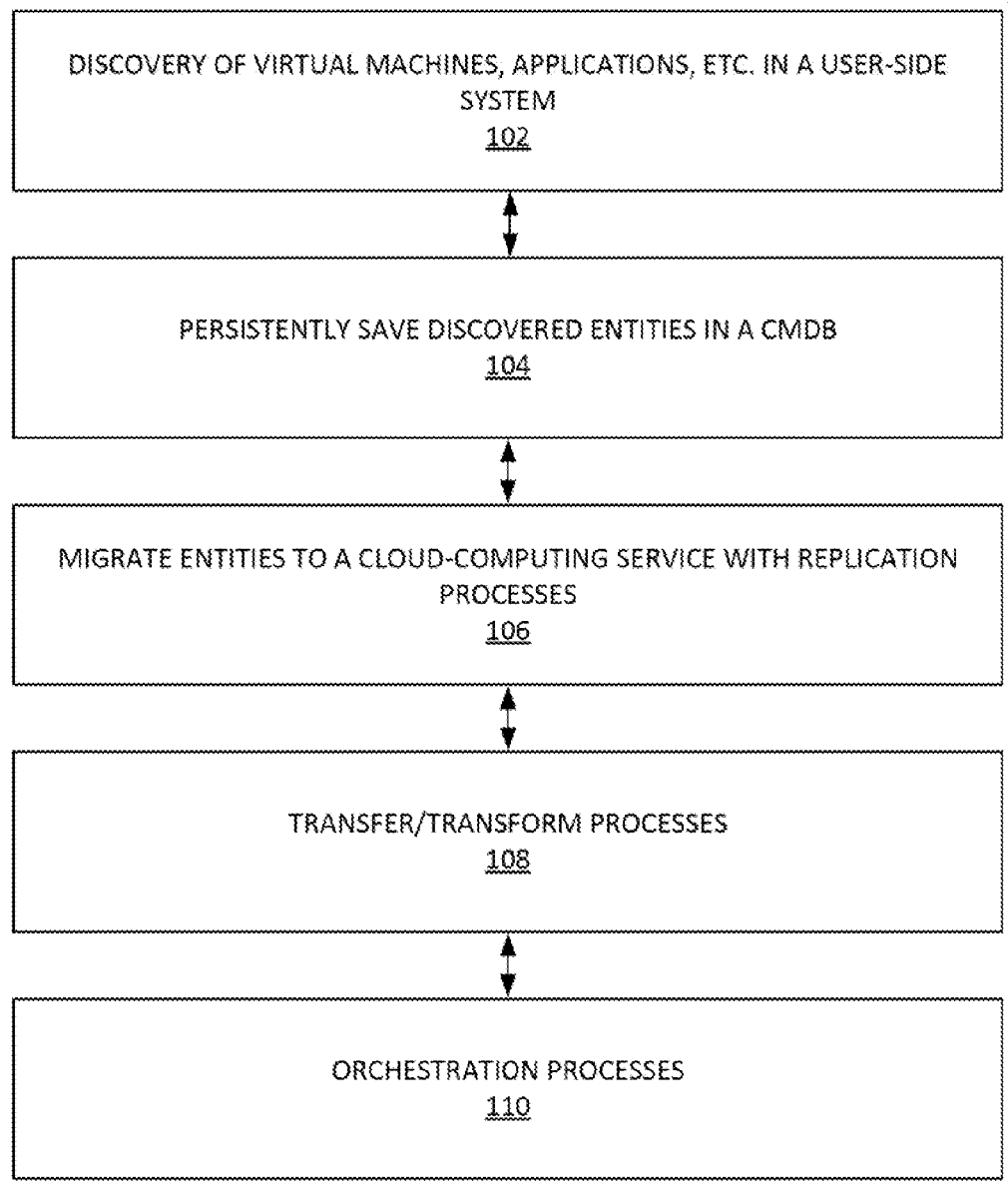
FIG. 1 illustrates an example process for workload mobility across divergent platforms, according to some embodiments.

The Figures described above are a representative set, and are not an exhaustive set with respect to embodying the invention.

DESCRIPTION

Disclosed are a system, method, and article of manufacture of workload mobility across divergent platforms. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Amazon Web Services (abbreviated AWS) can be a collection of remote computing services (also called web services) that together make up a cloud computing platform, offered over the Internet by Amazon.com.

Application discovery and understanding (ADU) can include a process of automatically analyzing artifacts of a software application and determining metadata structures associated with the application in the form of lists of data elements and business rules.

Application programming interface (API) can specify how software components of various systems interact with each other.

Configuration management database (CMDB) can be a repository that acts as a data warehouse for information technology (IT) organizations. It is noted CMDB can be specific case, in other examples the discovered items can be stored in any database.

Data de-duplication can include a specialized data compression technique for eliminating duplicate copies of repeating data. As used herein, data de-duplication can also include related techniques, such as, inter alia, intelligent (data) compression and single-instance (data) storage.

Development testing can include a software development process that involves synchronized application of a broad spectrum of defect prevention and detection strategies in order to reduce software development risks, time, and costs.

Disaster recovery (DR) can include a set of policies and procedures to enable the recovery or continuation of vital technology infrastructure and systems following a natural or human-induced disaster.

JSON (JavaScript Object Notation) is an open standard format that uses human-readable text to transmit data objects consisting of attribute-value pairs.

Platform as a service (PaaS) can be a category of cloud computing services that provides a computing platform and a solution stack as a service. It can be a service model of cloud computing. In this model, the consumer can create an application or service using tools and/or libraries from the provider. The consumer can also control software deployment and/or configuration settings. The provider can provide the networks, servers, storage, and/or other services for hosting the consumer's application.

Representational state transfer (REST) can include an abstraction of the architecture of the World Wide Web. REST can be an architectural style including a coordinated set of architectural constraints applied to components, connectors, and/or data elements, within a distributed hypermedia system.

RabbitMQ can be an open source message broker software (e.g. message-oriented middleware) that implements the Advanced Message Queuing Protocol (AMQP).

Software development kit (SDK) can be a set of software development tools that allows the creation of applications for a certain software package, software framework, hardware platform, computer system, video game console, operating system, and/or similar development platform.

WebSocket can be a protocol providing full-duplex communications channels over a single TCP connection. Websocket can typically be implemented in a browser and there also exist some libraries.

Virtual machine (VM) can be an emulation of a particular computer system. Virtual machines can operate based on the computer architecture and functions of a real and/or hypothetical computer, and their implementations may involve specialized hardware, software, and/or a combination of both.

vSphere is VMware's cloud computing virtualization operating system.

Exemplary Methods

Various systems and methods provided herein can be used for seamlessly migrating workload (e.g. virtual machines and/or applications) across divergent platforms (e.g. across hybrid cloud platforms).

FIG. 1 illustrates an example process 100 for workload mobility across divergent platforms, according to some embodiments. Process 100 can be an agentless process. It is noted that prior to the implementation of process 100, the use cases that the customer wished to solve can be determined. For example, a series of configuration questions can be provided to the user. Said user responses can be utilized to guide various aspects of process 100. A list of example use cases that can be implemented, inter alia, by process 100 (as well as other processes and systems provided herein) are now provided. Process 100 can be utilized for development testing. For example, a user can write/implement software code in a cloud platform independent of the user-side platform. The software code can thus be tested and analysed before integrated into the user-side platform. Process 100 can be utilized for disaster recovery procedures and systems. Process 100 can be utilized fix software bugs/problems. For example, a copy of said software can be migrated seamlessly to a cloud-computing platform for analysis and testing. Process 100 can be used to accommodate scaling of resources of a user-side platform. For example, during a post-Thanksgiving shopping period, the user-side platform may need new servers to accommodate an increase in workload. Process 100 can be utilized to leverage processing power in a cloud-computing platform to modify the user's processing/data storage parameters on an as-needed basis.

In step 102 of process 100, the various entities (e.g. virtual machines, application etc. implemented on the user-side (e.g. in a user's datacenter, the 'On prem' of FIG. 2, etc.)) can be discovered (e.g. application fingerprinting, etc.). For example, a discovery module (e.g. as provided infra) can determine the types of applications running on various virtual machines in the user-side platform. A user can assign various use cases to implement (e.g. see supra) with said discovered entities. The configuration of these entities can also be discovered (e.g. their network configurations, IP addresses, firewall policies, load-balancing policies, etc.) and persistently stored in a CMDB in step 104. After discovery and storage, various mobility-related steps can be implemented.

In step 106, replication processes can be used to migrate the discovered entities to a cloud-computing platform from the user-side platform(s). Replication can be performed by a replication module (e.g. see infra). Replication can include the process(es) of moving workload data (e.g. VM's, etc.) from a user-side platform(s)/system(s) to a cloud-computing platform(s). For example, specified SDKs and/or APIs provided by vSphere (or similar system) can be used to move the VMs to a specified cloud-computing platform. It is noted that various transport optimization techniques can be used to reduce network bandwidth utilization (e.g. data de-duplication, encrypting data, data compression, etc.). The data packets can then be reassembled in the cloud-computing platform. But there is a newer approach for some other cases. In some embodiments, a CANDL (Cloud Agnostic Data Layer) layer/module can abstracts the data of the application and use a filesystem technique (e.g. takes snapshots, clones and replicas, etc.).

In step 108, transfer and/or transformation can then be applied to the workload data to enable implementation of the workload data in the specified cloud-computing platform. For example, the vSphere VMs can be transformed to another VM-type capable of operating in an Openstack® cloud-computing platform. In step 108, workload assets in the cloud-computing platform can be mapped to workload assets in the user-side platform. For example, a fire-wall policy of a VM of a Cisco® network switch in the user-side platform can be mapped to a security configuration in AWS. Mapping elements can be maintained in tables and curated by system administrators.

In step 110, orchestration processes can be implemented. The workload assets now in the cloud can be 'powered on' and brought online (e.g. assigned network IP addresses, assigned security policies, etc.). Various verification processes can also be applied to the cloud-computing side workload assets to ensure that they are properly working. In one embodiment of process 100, any changes to the user-side workload asset can be updated in the cloud-computing platform side workload assets (and/or vice versa). In this way, a workload asset can be maintained in a substantially current state (e.g. assuming networking and processing latencies, etc.). In one example, for a container-based workload, process 100 can interact with software like (e.g. kubernetes, etc.). For example, kubernetes (http://kubernetes.io/) can be extended for delivering advanced application and/or data policies.

In one example, the orchestration process can be customized and automated. It can be controlled based on the inputs from a management platform which can provide all the discovered information from the source environment including but not limited to configurations of virtual machines, applications configuration, network configurations and/or security policies. A workload-migration management platform can send this information over a message bus. An orchestration management component can make use of native-template based orchestration services (e.g. using 'heat' in case of OpenStack®). It integrates other core components of the workload-migration management platform (e.g. an OpenStack platform) into a one-file template system. The template enables to create most workload-migration management platform resource types such as instances, floating IPs, volumes, security groups, users and so on. Also, the workload-migration management platform can provide additional functionalities such as instance high availability, instance auto-scaling and/or nested stacks. This can be adequately followed by integration of Chef/puppet to configure applications once instances have been instantiated. Chef/puppet can not only cater to installation and configuration requirements of the selected applications but can also take care of making them service ready.

In some examples, in the process 100 can involve a physical server workload to a virtual machine (VM) workload. A physical workload and/or virtual workload can be converted to a container workload. In one example, the workload may not exist before hand and our software can help in the deployment of the workload itself and then help with other steps (e.g. development, testing, cloud migration, disaster recovery (DR), cloud bursting, etc.). For green field case (e.g. a non pre-existing application deployment), an application can be defined in app.ml file. The SW can deploy and manage it for test/dev, migrate, scale, upgrade etc.

Exemplary Computer Architecture and Systems

The systems of the system figures of U.S. Provisional Patent Application No. 62/043,961 titled, METHODS AND SYSTEMS OF WORKLOAD MOBILITY ACROSS DIVERGENT PLATFORMS, and filed on 29 Aug. 2014 (incorporated herein by reference in its entirety) can be used to implement process 100. For example, a workload migration system can be utilized. Management platform (e.g. management layer) can include various modules can be implemented to perform actions such as discovery, replication, transfer, transformation and/or orchestration of workload from one platform for another (e.g. from a user-side data center to an offsite cloud-computing platform). The management platform can control the proper execution of these modules for an effective and seamless migration of the workload. It is noted that the systems and methods provided herein can also be utilized to migrate workload in any direction between divergent platforms (e.g. back from an offsite cloud-computing platform to a user-side data center). In one example, the management platform can detect multi-tier applications, their configurations and data in a discovery process. The management platform can be include customer-facing aspects and drive the user requests. It can be delivered as a platform (e.g. using a PaaS model). The management platform can implement a RESTful API (see infra) and initiate/coordinate with modules provided supra. The management platform can communicate with these modules using a private message-driven API implemented using a 'message bus' service. The management platform's user interface (UI) clients can communicate with the management platform using the RESTful API and/or other communication protocol(s). When this application snapshot is captured, the application can be orchestrated through different stages of the application lifecycle, across different cloud hypervisors and storage platforms (e.g. in the transfer, transformation and/or orchestration processes). An example message bus can be used to communicatively couple the various components of a workload migration system, according to some embodiments. In one example embodiment, the communication between the management platform and the migration modules (e.g. a 'GeminiStack') can implemented as a duplex (e.g. two-way communication) as the operations carried out by the modules may be long-running and asynchronous. In some examples, a RESTful API can be used. In some examples, a message bus layer can be implemented between the components. Either side (e.g. the cloud-computing platform(s) and/or the user-side platform(s)) may post messages to appropriate queues to trigger actions and/or specify notifications. In this manner, either side can perform the roles of both 'publisher' and 'subscriber' of said messages as needed and/or at appropriate times and effectively trigger remote actions. In one example embodiment, a 'rabbitMQ' (and/or other message broker software, message-oriented middleware that supports clients for multiple programming languages, etc.) can be used as the specific implementation of the message bus.

In some examples, the message bus implementation (such as with rabbitMQ®) can utilize a message server. The message server can bind to a specific and well-known port. Clients can post messages by connecting to this <host>:<port> 2-tuple parameter. In some customer environment examples, it may be possible that certain ports are blocked and the firewall settings may prohibit exceptions. In this is the case, the message bus may not be operative on all ports. However, ports 80 and/or 443 may be open—if this is the case and ports 80 and/or 443 are available, a 'websocket' technology can be used. This can provides full-duplex communication channels.

In some embodiments, the management platform can expose a public RESTful API as a presentation layer. The presentation layer can include the several types of clients such as, inter alia, a Web application in the cloud (e.g. a SaaS bundled along with the management platform), a Web application at the user-side platform, a command-line tool, and/or a browser add-on (e.g. as Mozilla RESTclient® to be used during code development phase and testing), etc. Other third-party vendors may also create custom UI applications and/or integrate with their products (e.g. a third-party custom portals and/or dashboards).

Client applications (e.g. CLI, GUI, etc.) can use the same publicly available RESTful API regardless of their locations or technology/language choice. Accordingly, client applications can use the same functions. Additionally, when the RESTful API is updated and published, the client applications can readily make use of the new features. The RESTful API can expose a collection of workflows. A workflow can be an encapsulation of sequential operations that need to be carried out as an atomic unit. For example, the API can expose the workflows as simple RESTful calls each with a distinct name/identifier. The management platform ca transparently hide the implementation details of how it obtains the operations executed by the migration modules. Examples of workflows include operations such as Clone, DR etc.

In one example, the RESTful API can have calls implemented on the platform. Calls can define a complete URL. The URL can include a base URL [protocol (http or https, with the latter recommended), hostname or IP address, port number], followed by path components (e.g. as provided infra). By way of example, a basic URL can be 'https://gemini-systems.net' and selected port number can be '443'. In the event that other similar RESTful API's are implemented, a suitable unique keyword can be chosen. This can be followed by the version number of the API. Accordingly, this sequence can allow for backward comparability such that when a new version of the API is implemented, client applications which are still using an older version can still continue to function properly. Finally, this can be followed by the desired verb(s)/noun(s) part of the API call. Calls that require parameters can accept them in JSON format. Likewise responses from the management platform can be in JSON format as well.

The RESTful API can be implemented on the management platform using any of the standard server-side frameworks that uses technologies like PHP, rails, grails etc. It may use standard data storage technology such as RDBMS implementations like MySQL or NoSQL implementations (e.g. Redis® and the like). The Web application on cloud (e.g. as a SaaS) can be implemented as simple HTML/CSS and/or then enhanced to use client-side technology such as Angular-JS etc.

It is noted that the various modules communicate to each other through a common set of protocols of the intermediary message bus. The modules do not directly communicate with each other. In this way, the specifications of the various modules (e.g. written in different programming languages, using diverse internal protocols, etc.) can be modified and/or replaced without the need to update other modules in the system. Each module can comply with the common interface of the message bus. For example, a replication module that is specific to vSphere can be replaced with another replication module that is specific to Hyper-V without the need to modify the other modules of the system as each replication module version utilizes the common interface of the message bus. The system is also scalable as additional modules can be added and/or removed on an as needed basis.

An example system of communication between the management platform and the migration modules, according to some embodiments. The management platform can be implemented in a cloud-computing environment. In order to utilize the management platform, a set of binary files (e.g. the 'Install GeminiStack(s)') can be downloaded to the user-side system (e.g. a data center). Management platform can be access by user-side system users via a user interface (UI).

An example discovery module can be implemented, according to some embodiments. Abstract interface layer can enable the discovery module to discover any time of virtual machine and/or system. Aggregator layer can aggregate information from different sources in order make the obtained information meaningful. Once the information is aggregated, the discovery module can determine specific attributes/details about the discovered virtual machines and/or systems. The discovery module can also perform application discovery. These applications can be running on the discovered virtual machines and/or systems.

In one embodiment, a discovery module can discover details regarding the cloud (e.g. VM details such as number of instances etc.) and complete information on applications running on the VM instances. The discovery module can use a generic interface layer and specific implementation layer with plugins. Custom (e.g. cloud-platform specific) plugins for the VM can collect VM details. Application specific plugins can collect application details (e.g. in order to build an Application Descriptor Container (ADC)) can be developed. The application discovery plugins can use native code and/or libraries as required (e.g. for Windows® endpoints where WMI can be used). The discovery module can aggregate the information collected and/or store it persistently (e.g. via a CMDB module) communicating through the message bus. The management platform can use the discovered (and/or stored) information to carry out various workflow sequences, such as, inter alia: passing relevant information to the other modules such as Replicate, Transfer and Orchestrate. In order to collect application details from all of the VM instances within the cloud, various mechanisms and/or process can be used to execute remote plugins (e.g. an agent-based approach or an agent-less approach). Various monitoring tools (e.g. an open source computer system monitoring, network monitoring and infrastructure monitoring software application such as Nagios® can collect detailed machine inventory data, tailored to suit the monitoring needs. For example, in an agent-based approach, a Nagios Remote Plugin Executor (NRPE) can be installed on the end-points with one Nagios® server configured. However, since for our purpose, which is not monitoring but only application discovery, it may not be justifiable to deploy a monitoring tool's agent. Besides, for collection of complete application information, we may be required to develop custom plugins for this purpose, in any case. In one example, an open-source software platform for configuring and managing computers (e.g. configuration management tools such as those provided by Ansible® and/or Puppet Enterprise®) can be used. An agent-less automation and configuration tool (e.g. Ansible® tools) can utilize a 'remote execution' mechanism that uses the SSH. The functionality of the platform for configuring and managing computers can be extended by developing playbooks and/or modules.

In one example, the application discovery sub-module(s) can utilize configuration management tools to communicate with instances of virtual machines to discovery the virtual machine information, application information, etc. It is noted that software does not need to be installed inside the virtual machines. Various application patterns and fingerprints can be obtained from the virtual machines. These can then be utilized to determine the application(s) running therein.

In one example of virtual machine discovery, a cloud server's API can be utilized for the discovery process. For example, in the case of the VMware ESX, vSphere Websdk API can be utilized. For example, a python library called psphere, can provide the native Python bindings for the vSphere Web Services SDK (formerly known as VMware Infrastructure SDK). Accordingly, the various details of the 'host system(s)' and many properties (such as numCpu, memorySizeMB, overallCpuUsage, privateMemory etc.) can be obtained.

In one example of application discovery, a configuration management tool (e.g. Ansible®) can be used as the vehicle for remote execution of scripts. In a windows-environment, the configuration management tool can use winrm (e.g. a Python library such as pywinrm, can be utilized for winrm discovery). PowerShell scripts can read from Windows Registry for gathering the list of installed applications. The list of installed apps is used a starting point, it can be matched with a scan application list on the UI. When a match is found, this application can be probed further detailed configuration items as discussed below.

An example of application finger printing is now provided. Configuration management tool (e.g. Ansible®) can be used (e.g. via winrm) along with the execution of custom PowerShell scripts. PowerShell cmdlets (e.g. to collect details on SharePoint 2010, SP cmdlets such as Get-SPSite, Get-SPDatabase etc. can be used). Custom PowerShell scripts can also use general Microsoft Windows cmdlets and/or other PowerShell techniques (such as reading from registry, as in the application discovery case etc.) to further add to the application details collected. Using this approach we collect application specific configuration items. The IP address of a virtual machine (e.g. as obtained supra) can be used to query the switches, firewalls and/or load balancers to obtain application specific policies. These policies can be saved in the CMDB module and used when provisioning to the cloud-computing platform.

An example CMDB module can be implemented, according to some embodiments. CMDB block can also include an abstraction layer. In one example, an open source CMDB (e.g. OneCMDB®) can be utilized. The CMDB can persistently store data in specified formats. The information discovered and/or learned by the discovery module system can be stored in CMDB module. This data store can be read and migrated to a cloud-computing platform.

An example scheduler and replication transform module can be implemented, according to some embodiments. Scheduler module can receive a message from the management platform via the message bus. Schedule module can control the workings of the replication/transforms processes (e.g. when to start replication, how many times to resend if error detected, etc.).

An example of a transform process is now provided by way of example and not of limitation. A transform process can change VM images to prepare them for implementation on a target cloud-computing environment. In this particular example, the target cloud-computing environment in Openstack®. It is noted that similar steps can be adopted for Amazon AWS® and Azure® cloud-computing platforms. These steps can be automated using a combination of target cloud APIs (e.g. Openstack®) and using scripts like batch/Perl/Python and using development tools like Ansible® and/or Puppet Enterprise®, etc.

Example steps to steps to prepare of Windows Image Openstack are now provided. First, WinPE ISO can be created as a temporary environment (e.g. a Windows Pre-installation Environment®). For example, WAIK can be obtained and Windows PE ISO can be created. This can also include batch script for Driver inject, etc. Second, the prepared information can be migrated to Openstack®. For example, the replicated VMDK can be migrated to an Openstack Cinder. An ISO can also be migrated to Openstack Glance. Third, the WinPE can be booted. For example, the WinPE ISO can be booted. The cinder volume ca be created from the replicated VMDK. An Inject Driver is now provided: i) copy the Virtio driver to the attached Cinder volume (VMDK file) %Driver Letter%\Windows\System32\drivers\; ii) hive the Cinder volume Registry file (%Driver Letter%\Windows\System32\config\SYSTEM) with tempname and run the batch script to inject the required registry entry for the copied Virtio driver in the hived registry path. To Remove the VMware tools by following steps can be implemented (e.g. automated with a batch script): i) HKLM\Software\Microsoft\Windows\CurrentVersion\uninstall and search for "VMware Tools". And delete the branch associated with it; ii) HKLM\Software\Classes\Installer\Products and search for "VMware Tools". And delete the branch associated with it; iii) HKEY_CLASSES_ROOT\Installer\Products and search for "VMware Tools". And delete the branch associated with it; iv) HKLM\Software\VMware Delete the branch called "VMware Tools"; v) Delete this folder %ProgramFiles%VMware\VMware Tools. Steps for installing a CloudInit package are now provided: i) generate a batch script with the required registry entry for make valid cloudinit installation; ii) copy the Cloudinit package into %driverletter%\Program Files\ (note: to find the registry entry required for valid cloudinit installation follow these steps: i) Take a fresh windows machine and obtain a backup of registry from it; ii) install cloudinit windows package; iii) backup the registry after package installation); iv) determine difference of the backup taken.

An example implementation of the replication and/or transport modules is now discussed, according to some embodiments. In this example, a vSphere system can be replicated to the cloud-computing platform. Accordingly, VMware's SDK can be utilized to implement an API to read, merge and prepare data for transport. As noted supra, transport module can prepare data for optimized transport (e.g. duplication, compression, encryption, etc.).

Example modules in the cloud-computing platform that receive the data are now discussed, according to some embodiments. Replication module can receive the data and reassemble it according to the specified cloud-computing platform protocol.

Figure 2:
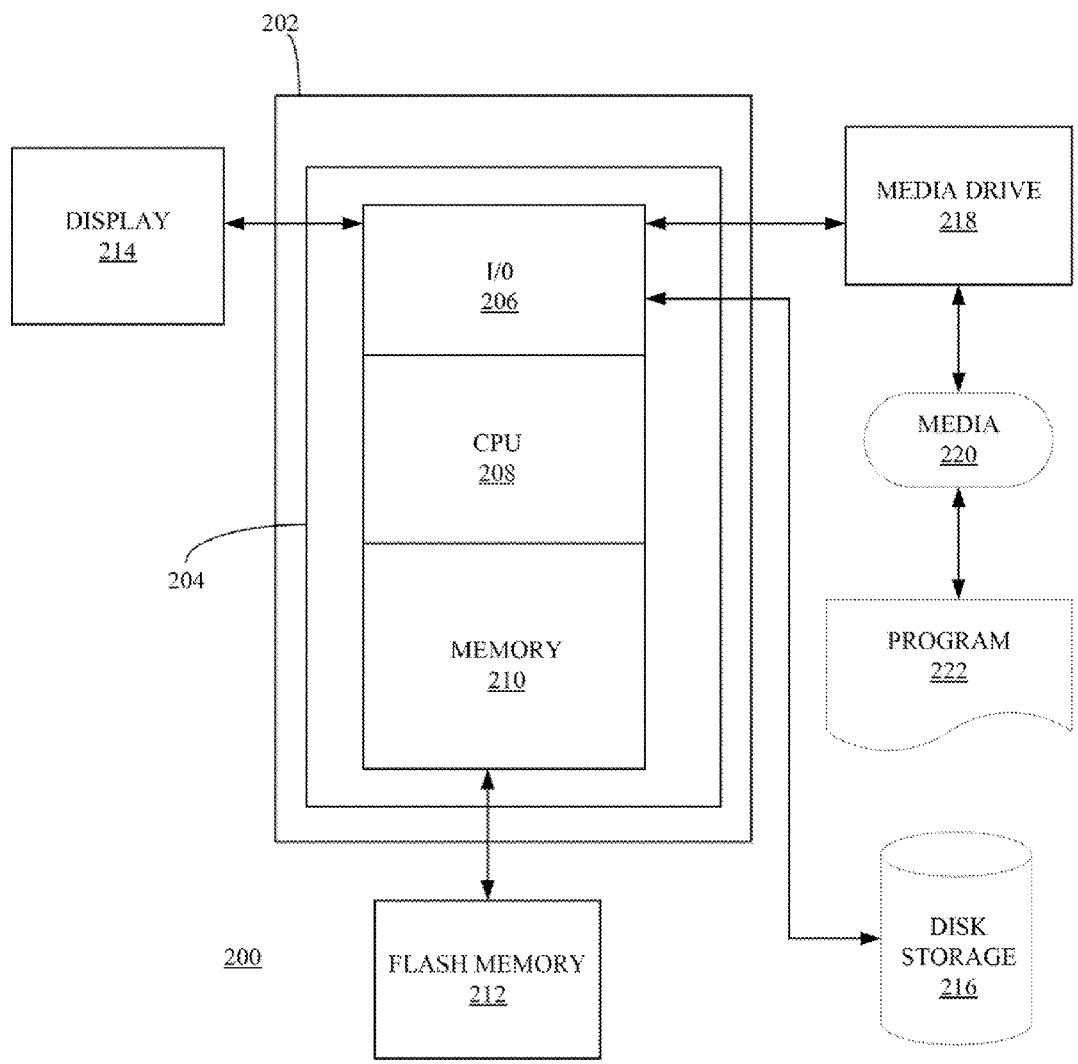
FIG. 2 is a block diagram of a sample computing environment that can be utilized to implement various embodiments.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method of workload mobility across divergent cloud-computing platforms comprising:
    with an agentless process, utilizing at least one computer process:
    discovering an entity, wherein the entity comprises a user-side virtual-machine application, wherein the user-side virtual-machine application comprises a user-side datacenter application, and wherein the entity is discovered using a fingerprinting application;
    discovering a configuration of the entity, wherein the configuration of the entity comprises a network configuration, an internet-protocol (IP) addresses, a firewall policy, and a load-balancing policy;
    persistently storing the configuration of the entity in a configuration management database (CMDB);
    migrating, with at least one replication processes, the entity from a user-side platform to a cloud-computing platform;
    transforming a workload data of the entity to a container workload data to enable implementation of the workload data in the cloud-computing platform, wherein the workload assets is implemented in the cloud-computing platform, wherein a workload of the workload data is transformed to a container workload, and wherein the step of transforming, the workload data of the entity to enable implementation of the workload data in the cloud-computing platform further comprises:
    mapping a workload asset in the cloud-computing platform to workload asset a in the user-side platform; and
    bringing a workload asset associated with the entity online with at least one orchestration processes.

2. A computerized system comprising:
    a processor configured to execute instructions;
    a merry containing instructions when executed on the processor, causes the processor to perform operations that:
    with an agentless process, utilizing at least one computer process:
    discover an entity, wherein the entity comprises a user-side virtual-machine application, wherein the user-side virtual-machine application comprises a user-side datacenter application, and wherein the entity is discovered using a fingerprinting application;
    discover a configuration of the entity, wherein the configuration of the entity comprises a network configuration, an internet-protocol (IP) addresses, a firewall policy, and a load-balancing policy;
    persistently store the configuration of the entity in a configuration management database (CMDB);
    migrate, with at least one replication processes, the entity from a user-side platform to a cloud-computing platform;
    transform a workload data of the entity to a container workload data to enable implementation of the workload data in the cloud-computing platform, wherein the workload assets is implemented in the cloud-computing platform, wherein a workload of the workload data is transformed to a container workload, and wherein the step of transforming, the workload data of the entity to enable implementation of the workload data in the cloud-computing platform further comprises:
    map a workload asset in the cloud-computing platform to workload asset a in the user-side platform; and
    bring a workload asset associated with the entity online with at least one orchestration processes.

* * * * *